US012682573B2

(12) United States Patent
Zheng et al.

(10) Patent No.: US 12,682,573 B2
(45) Date of Patent: Jul. 14, 2026

(54) GENERATING 3D HAND KEYPOINTS FOR A MIXED REALITY AVATAR

(71) Applicant: INTERNATIONAL BUSINESS MACHINES CORPORATION, Armonk, NY (US)

(72) Inventors: Wei Jun Zheng, Shanghai (CN); Xiao Xia Mao, Shanghai (CN); Qing Lu, Shanghai (CN); Yuan Jin, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/180,290

(22) Filed: Mar. 8, 2023

(65) Prior Publication Data
US 2024/0303931 A1 Sep. 12, 2024

(51) Int. Cl.
*G06T 19/00* (2011.01)
*G06N 3/0475* (2023.01)
*G06N 3/08* (2023.01)

(52) U.S. Cl.
CPC ........... *G06T 19/00* (2013.01); *G06N 3/0475* (2023.01); *G06N 3/08* (2013.01)

(58) Field of Classification Search
CPC . G06T 19/00; G06T 2219/2021; G06T 19/20; G06N 3/0475; G06N 3/08; G06F 3/011; G06F 3/0304
See application file for complete search history.

(56) References Cited

U.S. PATENT DOCUMENTS 9,911,219 B2    3/2018  Fleishman
10,916,050 B1 *  2/2021  Lin ........................... G06T 7/70
(Continued)

FOREIGN PATENT DOCUMENTS

CN    105389539 B    6/2019
CN    106709951 B    10/2019
(Continued)

OTHER PUBLICATIONS

Mata, C.C.F., 2019. Two approaches to robust hand pose estimation: Generative modeling and semantic relations (Doctoral dissertation, Massachusetts Institute of Technology).*
(Continued)

*Primary Examiner* — Sarah Lhymn
(74) *Attorney, Agent, or Firm* — Joseph P. Curcuru

(57)    ABSTRACT

According to one embodiment, a method, computer system, and computer program product for mixed reality is provided. The present invention may include receiving 3D hand keypoints (keypoints) of a user's visible hand joints from the user's capturable hand, and visible hand joints, if any, from the user's uncapturable hand; using random noise sampled with a unit normal distribution as initial keypoints for the uncapturable hand joints from the user's uncapturable hand; inputting the received and the initial keypoints, in a preset order, into a trained 3D hand joint generative model; performing an iterative refinement of the uncapturable hand joints from the user's uncapturable hand using the trained (Continued)

3D hand joint generative model; identifying whether generated keypoints of the user's uncapturable hand are synchronized with the keypoints of the user's capturable hand; and rendering the generated 3D keypoints for the user's uncapturable hand joints using a 3D virtual hand modeler.

20 Claims, 4 Drawing Sheets

(56)                    References Cited

U.S. PATENT DOCUMENTS

| | | | |
|---|---|---|---|
| 10,929,654 B2 | 2/2021 | Iqbal | |
| 10,997,787 B2 | 5/2021 | Ge | |
| 2012/0157198 A1* | 6/2012 | Latta .................. | A63F 13/57 |
| | | | 463/31 |
| 2018/0024641 A1 | 1/2018 | Mao | |
| 2020/0410753 A1* | 12/2020 | Molyneaux .......... | G02B 27/017 |
| 2021/0122045 A1* | 4/2021 | Handa .................. | B25J 13/084 |
| 2022/0076433 A1 | 3/2022 | Bazarevsky | |

FOREIGN PATENT DOCUMENTS

| | | | | |
|---|---|---|---|---|
| CN | 111145865 A | | 5/2020 | |
| CN | 107066935 B | | 11/2020 | |
| CN | 107466411 B | | 4/2021 | |
| CN | 114111772 A | * | 3/2022 | .......... G01C 21/165 |
| CN | 115620399 A | * | 1/2023 | ............ G06V 40/28 |

OTHER PUBLICATIONS

Hampali, S., Sarkar, S. D., Rad, M., & Lepetit, V. (2022). Keypoint transformer: Solving joint identification in challenging hands and object interactions for accurate 3d pose estimation. In Proceedings of the IEEE/CVF conference on computer vision and pattern recognition (pp. 11090-11100).*

Ho, et al., "Denoising Diffusion Probabilistic Models," 34th Conference on Neural Information Processing Systems (NeurIPS 2020), Dec. 16, 2020, 25 pages, arXiv:2006.11239v2, Retrieved from the Internet: <URL: https://arxiv.org/abs/2006.11239>.

Ishii, et al., "Occlusion-Robust 3D Hand Pose Estimation from a Single RGB Image," 2021 17th International Conference on Machine Vision and Applications (MVA), Jul. 25-27, 2021 [accessed on Nov. 28, 2022], 5 pages, EEE, Aichi, JP, DOI: 10.23919/MVA51890. 2021.9511389, Retrieved from the Internet: <URL: https://ieeexplore. ieee.org/document/9511389>.

Malik, et al., "DeepHPS: End-to-end Estimation of 3D Hand Pose and Shape by Learning from Synthetic Depth," arXiv, Aug. 28, 2018, 10 pages, arXiv:1808.09208v1, Retrieved from the Internet: <URL: https://arxiv.org/abs/1808.09208>.

Malik, et al., "HandVoxNet++: 3D Hand Shape and Pose Estimation using Voxel-Based Neural Networks," IEEE Transactions on Pattern Analysis and Machine Intelligence, Dec. 5, 2021, 13 pages, arXiv:2107. 01205v2, Retrieved from the Internet: <URL: https://arxiv.org/abs/ 2107.01205>.

Mehta, et al., "XNect: Real-time Multi-Person 3D Motion Capture with a Single RGB Camera," ACM Transactions on Graphics [journal], Apr. 30, 2020, 24 pages, vol. 39, No. 4, Article 1, arXiv:1907.00837v2, Retrieved from the Internet: <URL: https:// arxiv.org/abs/1907.00837>.

Tolstikhin, et al., "MLP-Mixer: An all-MLP Architecture for Vision," arXiv, Jun. 11, 2021, 16 pages, arXiv:2105.01601v4, Retrieved from the Internet: <URL: https://arxiv.org/abs/2105.01601>.

Zhou, et al., "Monocular Real-time Hand Shape and Motion Capture using Multi-modal Data," arXiv [online], Mar. 11, 2022, 10 pages, arXiv: 2003.09572v3, Retrieved from the Internet: <URL: https://arxiv.org/abs/2003.09572>.

* cited by examiner

100

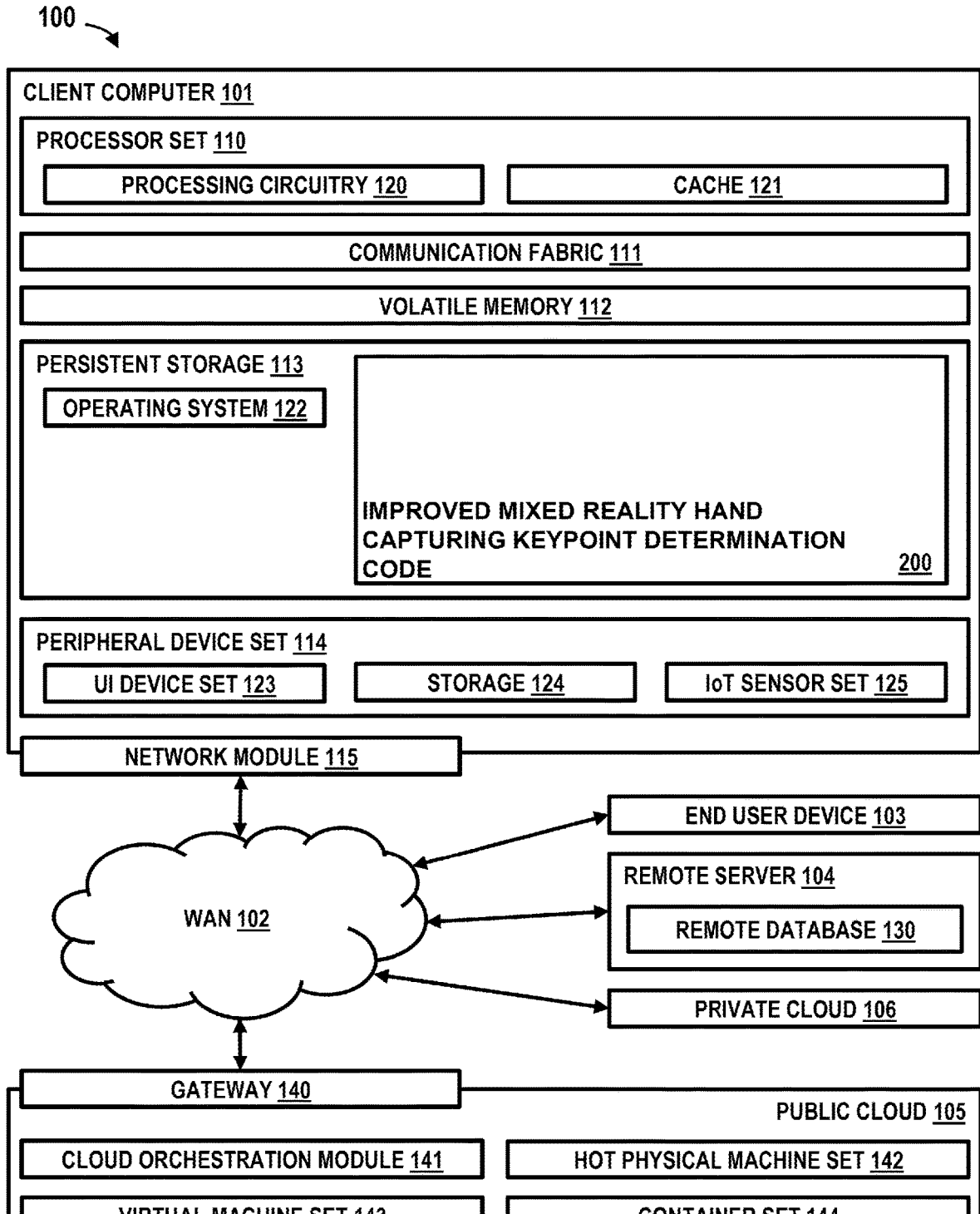

CLIENT COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

IMPROVED MIXED REALITY HAND CAPTURING KEYPOINT DETERMINATION CODE    200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOT PHYSICAL MACHINE SET 142

VIRTUAL MACHINE SET 143    CONTAINER SET 144

MIXED REALITY HAND CAPTURING KEYPOINT
DETERMINATION PROGRAM 200

MIXED
REALITY
MODULE
404

IoT
MODULE
402

3D VIRTUAL
HAND
MODELER
MODULE
406

MIXED
REALITY
DEVICE(S)
250

IoT
DEVICE(S)
252

DATABASE
130

GENERATING 3D HAND KEYPOINTS FOR A MIXED REALITY AVATAR

BACKGROUND

The present invention relates, generally, to the field of computing, and more particularly to mixed reality.

Mixed reality (MR) is a technology that uses software to overlay virtual information onto a virtual environment to provide a person with an authentic virtual experience. Mixed reality is built on the convergence of virtual reality (VR) and augmented reality (AR), which allows for a web of networked immersive experiences and social in multiuser persistent platforms. Currently, mixed reality can capture and estimate the movements of a user's hands based on the hands' visible hand joints. However, it may be common that many of the hand joints of a user are occluded, thus not able to be accurately captured and depicted in a virtual environment. Therefore, in order for mixed reality to provide a user with as immersive of an experience as possible, a method and system by which a user's hand movements are both accurately captured and displayed in a virtual environment, are needed. Thus, an improvement in mixed reality has the potential to benefit the overall user experience by providing the user with a truly immersive experience.

SUMMARY

According to one embodiment, a method, computer system, and computer program product for mixed reality is provided. The present invention may include receiving 3D hand keypoints (keypoints) of a user's visible hand joints from the user's capturable hand, and visible hand joints, if any, from the user's uncapturable hand; using random noise sampled with a unit normal distribution as initial keypoints for the uncapturable hand joints from the user's uncapturable hand; inputting the received and the initial keypoints, in a preset order, into a trained 3D hand joint generative model; performing an iterative refinement of the uncapturable hand joints from the user's uncapturable hand using the trained 3D hand joint generative model; identifying whether generated keypoints of the user's uncapturable hand are synchronized with the keypoints of the user's capturable hand; and rendering the generated 3D keypoints for the user's uncapturable hand joints using a 3D virtual hand modeler.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

DETAILED DESCRIPTION

Figure 2:
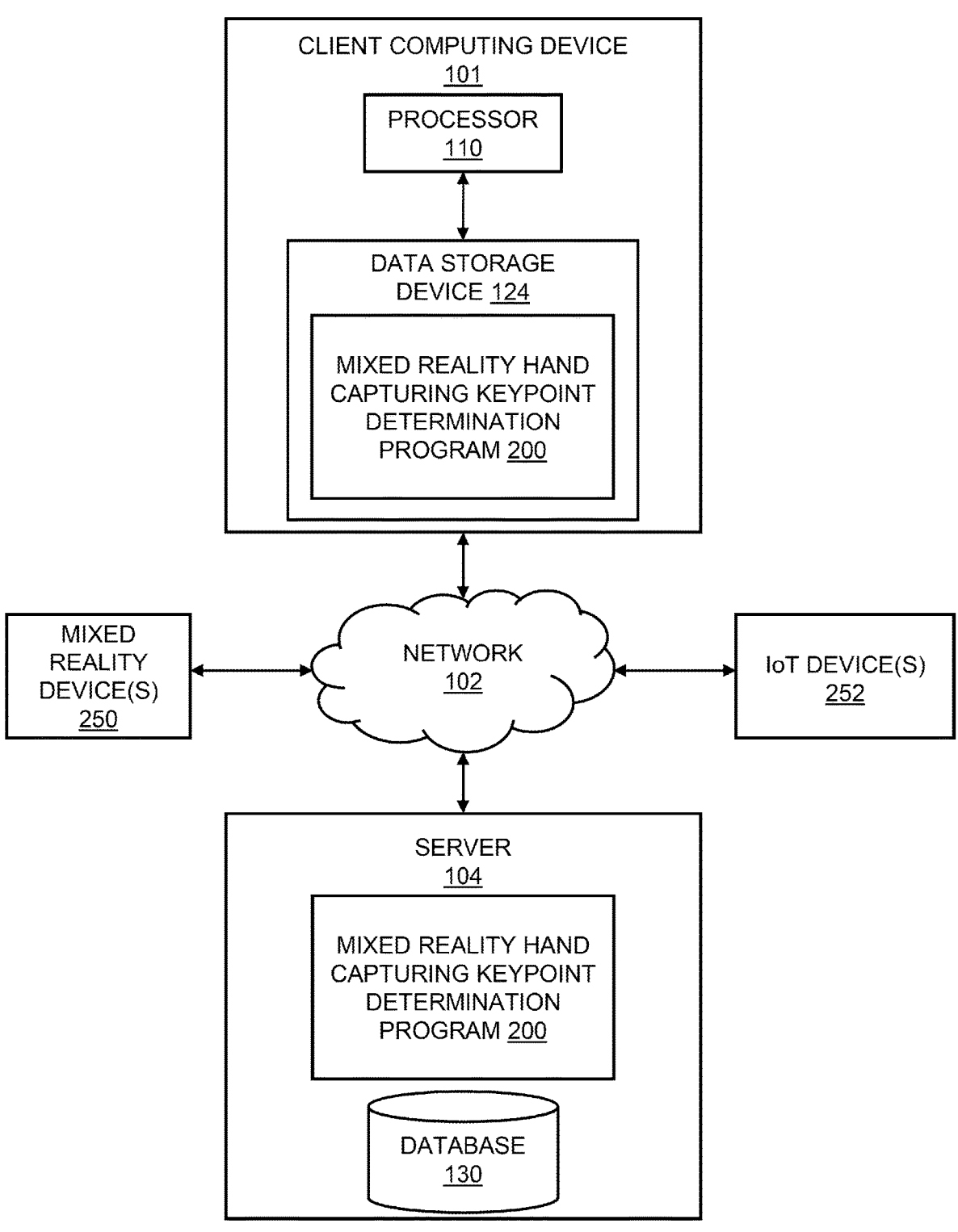
FIG. 2 illustrates an exemplary application invention environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In mixed reality, a person's movements can be captured and displayed in the virtual world to mimic the person's movements in the real world. Mixed reality can estimate a person's movements based on the captured movements of a user's visible joints. However, cases exist in which a person's joints, such as joints in the person's hands, are occluded, or the person's actions are otherwise not able to be captured. In order for a truly immersive mixed reality experience, a detailed and accurate display of a user's hand movements in a virtual environment is needed. Therefore, the optimization of mixed reality may be limited by the lack of a detailed and accurate display of a user's hand movements. As a result, users are not provided with an accurate experience, as the quality of their virtual reality is hindered by an inaccurate display of themselves.

One way in which current methods attempt to address problems with accurately displaying a user's hand movements in a virtual world is by estimating the movements of the occluded hand joints on a hand based on the movements of the captured hand joints in the hand and displaying the user's hand movements based on the estimation. Estimating the movements of a user's nonvisible hand may provide acceptable results when there are only a few occluded hand joints on a user's hands. However, one of the deficiencies of the current method is that the method is inadequate when the number of hand joints that are not visible on a user's hand comprises more than a few of the hand joints. It is important that a user's virtual model displays the user's captured actual actions in a more natural and complete state in a virtual environment. Thus, an improvement in mixed reality has the potential to benefit the overall user experience by providing the user with a truly immersive experience.

The present invention has the capacity to improve mixed reality by accurately displaying a user's hand movements in a virtual environment. The program can accurately capture a user's hand movements using a trained 3D hand joint generative model and display the hand movements in the virtual environment using a 3D virtual hand modeler. This improvement in mixed reality can be accomplished by implementing a system that receives 3D hand keypoints of a user's visible hand joints from the user's capturable hand and 3D hand keypoints of the user's visible hand joints, if any, from a user's uncapturable hand, uses random noise sampled with a unit normal distribution as initial 3D hand keypoints for one or more uncapturable hand joints from the user's uncapturable hand, inputs all the 3D hand keypoints from a user's two hands, in a preset order, into a trained 3D hand joint generative model, performs iterative refinement of the uncapturable hand joints from the user's uncapturable hand using the trained 3D hand joint generative model, calculates a two-hand synchronization value for the 3D hand keypoints of the user's two hands, identifies whether generated 3D hand keypoints of the user's uncapturable hand are synchronized with the 3D hand keypoints of the user's capturable hand, and renders the generated 3D hand keypoints for the user's uncapturable hand joints using a 3D virtual hand modeler.

In some embodiments of the invention, the mixed reality hand capturing keypoint determination program, herein referred to as "the program", can receive 3D hand keypoints of a user's visible hand joints from a user's capturable hand and 3D hand keypoints of the user's visible hand joints, if any, from a user's uncapturable hand. A user's capturable hand may comprise one of a user's two hands that has at least the majority of its hand joints visible. A user's uncapturable hand may comprise the other of the user's two hands that has most of its hand joints invisible, occluded, or amputated. The program can receive 3D hand keypoints, which are captured by the use of an MR device and/or one or more IoT devices, such as cameras. In some embodiments of the invention, the program may use a computer vision system to capture a user's 3D hand keypoints. The program can process 3D hand keypoints by using joint recognition algorithms.

The program can use random noise sampled with a unit normal distribution as the initial 3D hand keypoints for the one or more uncapturable hand joints from the user's uncapturable hand. The program can assign each uncapturable hand joint from the user's uncapturable hand with random noises as its initial 3D hand keypoint.

The program can input all the 3D hand keypoints from the user's two hands, in a preset order, into a trained 3D hand joint generative model. The 3D hand joint generative model can comprise a backbone network composed of L MLP (multilayer perceptron)—Mixer layers and a linear projection layer. The program can train a 3D hand joint generative model. The program can train a 3D hand joint generative model by collecting the respective 3D hand keypoints of a human's two hands as training datasets.

The program can perform a denoising diffusion processing during the training of the 3D hand joint generative model. The denoising diffusion processing may comprise uniformly selecting a value from a sequence of integers $[1, T]$ at random as the current diffusion time step t, and randomly selecting a pair of 3D hand keypoints of left- and right-hand joints from the training dataset. Additionally, denoising diffusion processing comprises corrupting each 3D hand keypoint of the uncaptured hand with a probability $\gamma \in [0.5, 1]$, and each 3D hand keypoint of a capturable hand with a probability $\varphi \in [0, 0.1]$. Furthermore, the denoising diffusion processing comprises adding random Gaussian noise, based on the value of the current diffusion time step t, to each coordinate value of the 3D keypoints of the corrupted hand joints. Performing the denoising diffusion processing may also comprise shaping both the corrupted pair of 3D keypoints of left- and right-hand joints, including noised 3D keypoints, and the current linearly projected diffusion time step t as a hand joint table, and then feeding the hand joint table into the generative model as input, in order to generate a new hand joint table, including denoised 3D keypoints. Additionally, performing the denoising diffusion processing may also comprise training the generative model to predict the unnoised 3D keypoints directly, and using a mean-squared error loss on the prediction.

The program can generate 3D hand keypoints for the uncaptured hand joints using the 3D hand joint generative model, conditioned on the 3D keypoints of the captured hand joints. The program can input all the 3D hand points of the user's two hands, comprising the 3D hand keypoints of the capturable hand and the generated 3D hand keypoints, in a preset order, and can sample the final 3D hand keypoints for the uncaptured hand joints after at most T diffusion time steps. Sampling the final 3D hand keypoints for the uncaptured hand joints can comprise using random noises sampled with a unit normal distribution as the initial 3D hand keypoints for the uncaptured hand joints and shaping them together with the 3D keypoints of the hand joints of the captured hand and the current linearly-projected diffusion time step (t=T), to generate a hand joint table. The program can input the hand joint table into the trained 3D hand joint generative model to generate a new hand joint table. The new hand joint table can be used for the input of the next denoising diffusion processing. At the subsequent diffusion time steps (from T–1 to 1), the trained 3D hand joint generative model can combine the generated 3D hand keypoints of the uncaptured hand joints from the previous diffusion time step, the original 3D hand keypoints of the captured joints, and the current linearly-projected diffusion time step t, into an input hand joint table, in order to generate further refined 3D hand keypoints of the uncaptured joints. The 3D hand keypoints generated at the last diffusion time step (t=1) can be considered the final sampling results for the uncaptured joints from the uncapturable hand.

The program can perform iterative refinement of the uncaptured hand joints from the user's uncapturable hand using the trained 3D hand joint generative model. The program can perform iterative refinement to sample 3D hand keypoints for the uncaptured hand joints of the uncapturable hand. The program can use the 3D hand keypoints of the user's visible hand joints from the user's capturable hand as prompts to guide the iterative refinement, otherwise known as gradual denoising, of the 3D hand keypoints for the uncaptured hand joints. Specifically, the program can input, at each diffusion time step, the original 3D keypoints of the visible hand joints and the generated 3D keypoints of the uncapturable hand from the 3D hand joint generative model at the previous diffusion time step, excluding the first diffusion time step. The 3D hand joint generative model can accept as input, and generate as a new output, a sequence of forty-seven three-dimensional vectors, also referred to as 3D coordinates, excluding the first vector, shaped as a table of a size 47×3, referred to as a hand joint table. Vectors two to twenty-four can comprise twenty-three 3D hand keypoints of the left hand. Vectors twenty-five to forty-seven can comprise twenty-three 3D hand keypoints of the right hand, respectively paired with the corresponding 3D hand keypoint of the left hand. When the sequence is first taken in as an input, its first vector, index equal to one, represents the current diffusion time step t, ranging from $[T, 1]$, where T can be a preset hyper-parameter and can indicate the maximum diffusion time step. The value of each diffusion time step t, an integer, can be represented as a one-hot encoding embedding at first, and then can be linearly projected to a three-dimensional vector. The three dimensions of a vector can represent the three-dimensional coordinate values, respectively. The program can respectively sort the left- and right-hand joints in the same order in a sequence. If the coordinate values are represented by integers, the program may convert the integers to floating-point numbers.

The program can calculate a two-hand synchronization value for the 3D hand keypoints of the user's two hands. The program can calculate a two-hand synchronization value for the 3D hand keypoints of the user's two hands using a trained two-hand synchronization analyzer. The program may input the generated 3D hand keypoints of the user's uncapturable hand and the 3D hand keypoints of the user's capturable hand into the trained two-hand synchronization analyzer at each diffusion time step. The program can train a two-hand synchronization analyzer by dynamically setting training labels according to the alignment between two time points when the 3D hand keypoints of the two hands, as the input of the analyzer, are respectively captured from within video clips. The video clips can be recorded during the building of the training dataset. The trained two-hand synchronization analyzer can analyze the 3D hand keypoints to calculate a two-hand synchronization value. The two-hand synchronization analyzer can utilize a Siamese Neural Network. The program can sample the 3D hand keypoints a total of T times in order to obtain high-quality 3D hand keypoints for the uncaptured hand joints of the uncapturable hand. In some embodiments of the invention, the program may leverage a preset threshold as the maximum two-hand synchronization value. The respective twenty-three 3D keypoints of a user's left-hand joints and right-hand joints can be considered as three-dimensional vectors and can be concatenated into a sixty-nine-dimensional hand joint vector. The program can respectively feed the hand joint vectors of the two hands into two MLP (multilayer perceptron) based encoders, whose parameters are shared. The two-hand synchronization analyzer can calculate the cosine similarity between two d-dimensional hand-joint feature vectors from the two encoders, in order to obtain the final two-hand synchronization value. The program may update the encoder's parameters using a mean-squared error loss.

The program can identify whether the generated 3D hand keypoints of the user's uncapturable hand are synchronized with the 3D hand keypoints of the user's capturable hand. According to one implementation, if the program identifies that the generated 3D hand keypoints of the user's uncapturable hand are synchronized with the 3D hand keypoints of the user's capturable hand, the program may continue to render the generated 3D hand keypoints for the user's uncapturable hand joints using a 3D virtual hand modeler. The program may identify, for the T−1 and subsequent samples, that the user's hands are synchronized if the calculated two-hand synchronization value, based on the generated 3D hand keypoints of the uncaptured hand joints at a certain diffusion time step, t>1, and the original 3D hand keypoints of the captured hand joints of the capturable hand, exceeds the maximum two-hand synchronization value resulting from the previous samples. If the program identifies that the user's hands are synchronized, the current denoising diffusion process can be stopped early, meaning less than the T diffusion time steps. The first sample T can be excluded from the calculation of the two-hand synchronization value. If the program identifies that the generated 3D hand keypoints of the user's uncapturable hand are not synchronized with the 3D hand keypoints of the user's capturable hand, the program may continue performing iterative refinement of the uncapturable hand joints from the user's uncapturable hand using the trained 3D hand joint generative model. The program can identify that the generated 3D hand keypoints of the user's uncapturable hand are not synchronized with the 3D hand keypoints of the user's capturable hand if the calculated two-hand synchronization value does not exceed the maximum two-hand synchronization value resulting from the previous samples.

The program can render the generated 3D hand keypoints for the user's uncapturable hand joints using a 3D virtual hand modeler. The program can render the generated 3D hand keypoints from the trained 3D hand joint generative model that were determined to be synchronized with the respective hand joints of the capturable hand. The program can render the generated 3D hand keypoints together with the original 3D hand keypoints of the captured hand joints to obtain a pair of intact and visible hands for a user's avatar in a mixed reality (MR) simulated environment.

The program can render a mixed reality (MR) simulated environment. The MR simulated environment, herein referred to as "the MR environment", may be a hybrid environment comprising both physical and virtual elements. The MR environment may comprise a hybrid physical/virtual world in which one or more users may enter, see, move around in, interact with, etc. through the medium of a MR device. The users in the MR environment may be able to see and/or interact with the same virtual objects and virtual elements and may interact with virtual representations of each other. The MR environment may comprise AR environments wherein generated images, sounds, haptic feedback, and other sensations are integrated into a real-world environment. The MR environment may comprise virtual reality (VR) environments that fully replace the physical environment with virtual elements, such that a user experiencing a VR environment cannot see any objects or elements of the physical world; however, the VR environments are anchored to real-world locations, such that the movement of the users, virtual objects, virtual environmental effects and elements all occur relative to the corresponding locations in the physical environment. The program can track the movements of the users. IoT devices, such as cameras and/or sensors, can be used to detect what actions are being performed by the users and the movement patterns of the users. For example, wearable IoT devices or movement detection sensors may be used.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to receive 3D hand keypoints of a user's visible hand joints from the user's capturable hand and 3D hand keypoints of the user's visible hand joints, if any, from a user's uncapturable hand, use random noise sampled with a unit normal distribution as initial 3D hand keypoints for one or more uncapturable hand joints from the user's uncapturable hand, input all the 3D hand keypoints from a user's two hands, in a preset order, into a trained 3D hand joint generative model, perform iterative refinement of the uncapturable hand joints from the user's uncapturable hand using the trained 3D hand joint generative model, calculate a two-hand synchronization value by using the trained two-hand synchronization analyzer, identify whether generated 3D hand keypoints of the user's uncapturable hand are synchronized with the 3D hand keypoints of the user's capturable hand, and render the generated 3D hand keypoints for the user's uncapturable hand joints using a 3D virtual hand modeler.

Referring to FIG. 1, an exemplary networked computer environment 100 is depicted, according to at least one embodiment. Computing environment 100 contains an example of an environment for the execution of at least some of the computer code involved in performing the inventive methods, such as improved mixed reality hand capturing keypoint determination code 200. In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run a mixed reality hand capturing keypoint determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running a mixed reality hand capturing keypoint determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store 3D hand models and 3D hand keypoints, and the data related to the 3D hand keypoints. Additionally, the database 130 can comprise the trained 3D hand joint generative model, the two-hand synchronization analyzer, and the training data used to train the model and the analyzer. The database 130 can comprise a knowledge corpus. The knowledge corpus may comprise information relating to previously used MR devices 250 and IoT devices 252. Additionally, the knowledge corpus can comprise information relating to the MR devices 250, and IoT devices 252. The knowledge corpus may be updated based on the MR devices 250 and IoT devices 252 used and the continuous tracking of users' hands. Also, the knowledge corpus may comprise information relating to object recognition.

Mixed reality (MR) device(s) 250 may be any device or combination of devices enabled to record world information that the MR module 404 may overlay with computer-generated perceptual elements to create a MR environment. The MR device(s) 250 can record the actions, position, movements, etc. of a user, to track the user's movement within and interactions with the MR environment. The MR device 250 can display a MR simulated environment to a user and allow the user to interact with the MR environment. The MR device 250 can be a headset. Also, the MR device 250 can comprise a head-mounted display (HMD). Additionally, the MR device 250 may be equipped with or comprise a number of sensors, such as a camera, microphone, and accelerometer, and these sensors may be equipped with or comprise a number of user interface devices such as touchscreens, speakers, etc.

IoT device(s) 252 may be any device capable of continuously identifying the relative positions of a user's hands while static or in movement. The IoT device(s) 252 can comprise cameras, such as any device capable of recording visual images in the form of photographs, films, or video signals, such as a physical or virtual camera, and/or sensors, such as accelerometers, gyroscopes, magnetometers, proximity sensors, pressure sensors, etc.

According to the present embodiment, the mixed reality hand capturing keypoint determination program 200 herein referred to as "the program", may be a program capable of receiving 3D hand keypoints of a user's visible hand joints of their capturable hand and 3D hand keypoints of the user's visible hand joints, if any, of their uncapturable hand, using random noise sampled with a unit normal distribution as the initial 3D hand keypoints for the uncapturable hand joints of the uncapturable hand, inputting all the capturable 3D hand keypoints of the two hands, in a preset order, into a trained 3D hand joint generative model, performing iterative refinement of the uncapturable hand joints of the uncapturable hand using the trained 3D hand joint generative model, calculating a two-hand synchronization value for the 3D hand keypoints of the user's two hands, identifying whether the generated 3D keypoints of the uncapturable hand are synchronized with the 3D keypoints of the capturable hand, and rendering the generated 3D hand keypoints for the uncapturable hand joints using a 3D virtual hand modeler. The program 200 may be located on client computing device 101 or remote server 104 or on any other device located within network 102. Furthermore, the program 200 may be distributed in its operation over multiple devices, such as client computing device 101 and remote server 104. The mixed reality hand capturing keypoint determination method is explained in further detail below with respect to FIG. 3.

Figure 3:
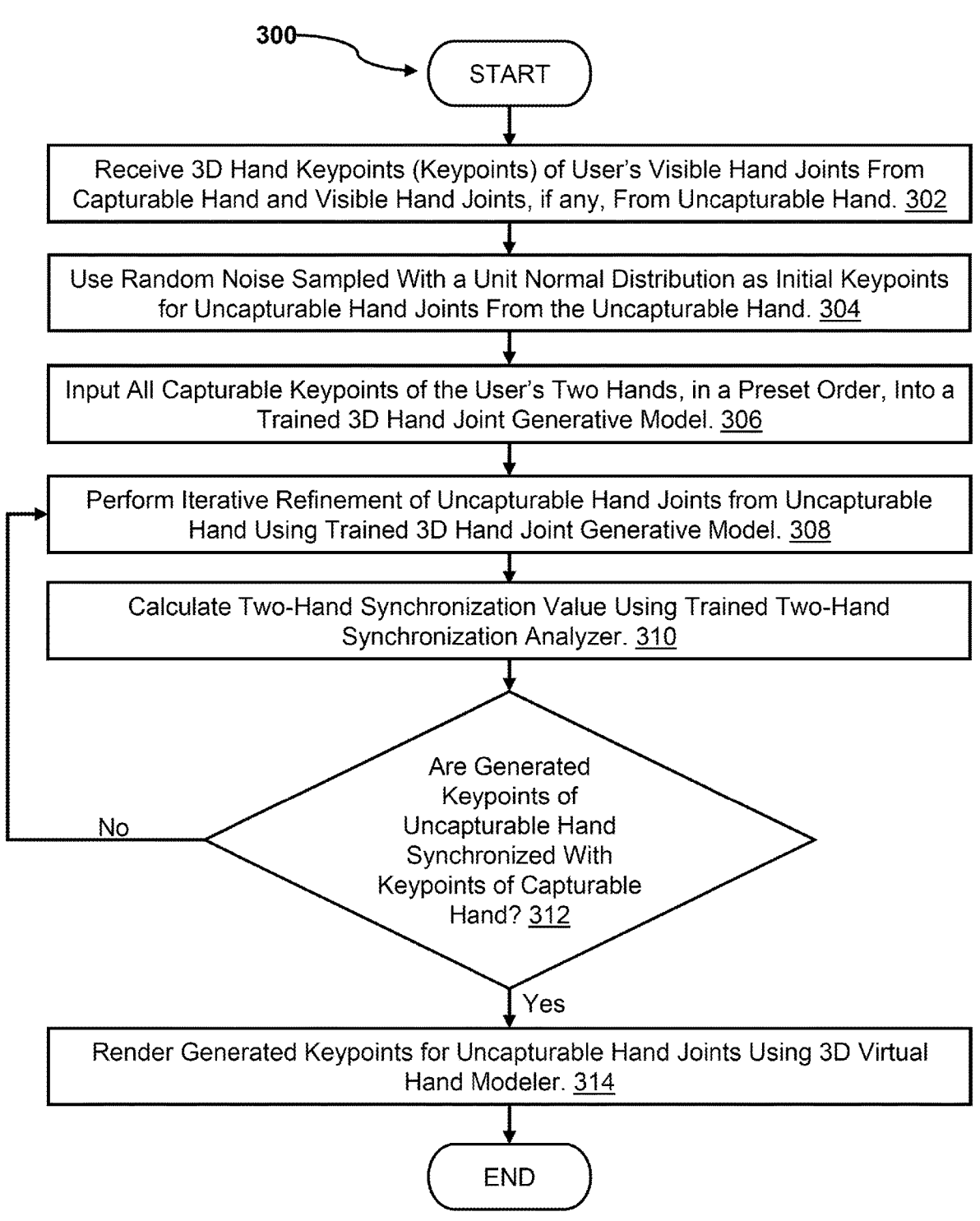
FIG. 3 is an operational flowchart illustrating an improved mixed reality hand capturing keypoint determination process according to at least one embodiment.

Referring now to FIG. 3, an operational flowchart illustrating a mixed reality hand capturing keypoint determination process 300 is depicted according to at least one embodiment. At 302, the program 200 receives 3D hand keypoints of a user's visible hand joints from a user's capturable hand and 3D hand keypoints of the user's visible hand joints, if any, from a user's uncapturable hand. A user's capturable hand may comprise one of a user's two hands that has at least the majority of its hand joints visible. A user's uncapturable hand may comprise the other of the user's two hands that has most of its hand joints invisible, occluded, or amputated. The program 200 can receive 3D hand keypoints, which are captured by the use of an MR device 250 and/or one or more IoT devices 252, such as cameras. The program 200 may also use a computer vision system to capture a user's 3D hand keypoints. The program 200 can process 3D hand keypoints by using joint recognition algorithms. The program 200 can display the captured visible hand joints as one color, such as a black dot, and indicate the uncaptured hand joints as another color, such as red dots, on the graphical user interface of the user's MR device 250.

At 304, the program 200 uses random noise sampled with a unit normal distribution as the initial 3D hand keypoints for the one or more uncapturable hand joints from the user's uncapturable hand. The program 200 can assign each uncapturable hand joint from the user's uncapturable hand with random noises as its initial 3D hand keypoint.

At 306, the program 200 inputs all the 3D hand keypoints from the user's two hands, in a preset order, into a trained 3D hand joint generative model. The 3D hand joint generative model can comprise a backbone network composed of L MLP (multilayer perceptron)—Mixer layers and a linear projection layer. The program 200 can train a 3D hand joint generative model. The program 200 can train a 3D hand joint generative model by collecting the respective 3D hand keypoints of a human's two hands as training datasets. A large number of videos can be uploaded to the program 200. The program 200 can play every video comprising one or more humans and can obtain real-time 3D keypoints of each human's body and hand joints in a video. The program 200 can employ an XNect monocular 3D pose estimation approach for performing 3D body capturing. 3D body keypoint predictions can be extracted from Stage II of XNect for the thirteen upper body joints. The thirteen upper body joints of a human may comprise two for the head, three for each arm, one for the neck, one for the spine, and three for the hip/pelvis. The program 200 can employ the monocular 3D hand pose estimation method for performing hand tracking. The program 200 can capture forty-six 3D keypoints for each human in a video, at every time point in the video. The forty-six 3D keypoints may comprise twenty-one left-hand joints, one left-shoulder joint, one left-elbow joint, twenty-one right-hand joints, one right-shoulder joint, and one right-elbow joint. The program 200 can save the respective 3D keypoints of both the left and right hand/arm joints, captured for a human at the same time point, as a pair in the training dataset.

The program 200 can perform a denoising diffusion processing during the training of the 3D hand joint generative model. The denoising diffusion processing may comprise uniformly selecting a value from a sequence of integers [1, T] at random as the current diffusion time step t, and randomly selecting a pair of 3D hand keypoints of left- and right-hand joints from the training dataset. Additionally, the denoising diffusion processing comprises corrupting each 3D hand keypoint of the uncaptured hand with a probability $\gamma \in [0.5, 1]$, and each 3D hand keypoint of a capturable hand with a probability $\varphi \in [0, 0.1]$. Furthermore, the denoising diffusion processing comprises adding random Gaussian noise, based on the value of the current diffusion time step t, to each coordinate value of the 3D keypoints of the corrupted hand joints. The random Gaussian noise can be calculated using the following formula:

$$q(x_t|x_0) = \mathcal{N}(x_t; \sqrt{\bar{\alpha}_t}\, x_0, (1 - \bar{\alpha}_t)I)$$

$$\alpha_t := 1 - \beta_t; \bar{\alpha}_t := \prod_{s=1}^{t} \alpha_s;$$

$\beta_t$ can be a linear schedule (e.g., from $\beta_1 = 10^{-4}$ to $\beta_T = 0.02$); $x_0$ can be an original coordinate value; and $x_t$ can be a noised coordinate value with the added Gaussian noise corresponding to the specific diffusion time step t. Performing the denoising diffusion processing may also comprise shaping both of the corrupted pair of 3D keypoints of left and right hand joints (including noised 3D keypoints $z^{(t)}$), and the current linearly-projected diffusion time step t as a hand joint table, and then feeding the hand joint table into the generative model as input, in order to generate a new "hand joint table" (including denoised 3D keypoints $z^{(t-1)}$). Additionally, performing the denoising diffusion processing may also comprise training the generative model to predict the unnoised 3D keypoints $z_i$ directly, and using a mean-squared error loss on the prediction using the following formula:

$$L = \mathbb{E}_{t \sim [1,T], z_i^{(t)} \sim q_t} \left[\left\| f_\theta\big(z_i^{(t)}, t\big) - z_i \right\|^2\right]$$

$$z_i^{(t)}$$

can be the noised 3D hand keypoints of the i-th corrupted hand joint, with the noise corresponding to the specific diffusion time step t; $z_i$ can be the original (unnoised) 3D keypoint of the i-th corrupted joint; and $f_\theta(\cdot)$ can be the prediction from the generative model.

The program 200 can generate 3D hand keypoints for the uncaptured hand joints using the 3D hand joint generative model, conditioned on the 3D keypoints of the captured hand joints. The program 200 can input all the 3D hand points of the user's two hands, comprising the 3D hand keypoints of the capturable hand and the generated 3D hand keypoints, in a preset order, and can sample the final 3D hand keypoints for the uncaptured hand joints after at most T diffusion time steps. Sampling the final 3D hand keypoints for the uncaptured hand joints can comprise using random noises sampled with a unit normal distribution as the initial 3D hand keypoints for the uncaptured hand joints, and shaping them together with the 3D keypoints of the hand joints of the captured hand and the current linearly-projected diffusion time step (t=T), to generate a hand joint table. The program 200 can input the hand joint table into the trained 3D hand joint generative model to generate a new hand joint table. The new hand joint table can be used for the input of the next denoising diffusion processing. At the subsequent diffusion time steps (from T−1 to 1), the trained 3D hand joint generative model can combine the generated 3D hand keypoints of the uncaptured hand joints from the previous diffusion time step, the original 3D hand keypoints of the captured joints, and the current linearly-projected diffusion time step t, into an input hand joint table, in order to generate further refined 3D hand keypoints of the uncaptured joints. The 3D hand keypoints generated at the last diffusion time step (t=1) can be considered the final sampling results for the uncaptured joints from the uncapturable hand.

At 308, the program 200 performs iterative refinement of the uncapturable hand joints from the user's uncapturable hand using the trained 3D hand joint generative model. The program 200 can perform iterative refinement to sample 3D hand keypoints for the uncaptured hand joints of the uncapturable hand. The program 200 can use the 3D hand keypoints of the user's visible hand joints from the user's capturable hand as prompts to guide the iterative refinement, otherwise known as gradual denoising, of the 3D hand keypoints for the uncapturable hand joints. Specifically, the program 200 can input, at each diffusion time step, the original 3D keypoints of the visible hand joints and the generated 3D keypoints of the uncapturable hand from the 3D hand joint generative model at the previous diffusion time step, excluding the first diffusion time step. The 3D hand joint generative model can accept as input, and generate as a new output, a sequence of forty-seven three-dimensional vectors, also referred to as 3D coordinates, excluding the first vector, shaped as a table of a size forty-seven by three, referred to as a hand joint table. Vectors two to twenty-four can comprise twenty-three 3D hand keypoints of the left hand. Vectors twenty-five to forty-seven can comprise twenty-three 3D hand keypoints of the right hand, respectively paired with the corresponding 3D hand keypoint of the left hand. When the sequence is first taken in as an input, its first vector, index equal to one, represents the current diffusion time step t, ranging from [T, 1], where T can be a preset hyper-parameter and can indicate the maximum diffusion time step. The value of each diffusion time step t, an integer, can be represented as a one-hot encoding embedding at first, and then can be linearly projected to a three-dimensional vector. The three dimensions of a vector can represent the three-dimensional coordinate values, respectively. The program 200 can respectively sort the left- and right-hand joints in the same order in a sequence. If the coordinate values are represented by integers, the program 200 may convert the integers to floating-point numbers.

At 310, the program 200 calculates a two-hand synchronization value for the 3D hand keypoints of the user's two hands. The program 200 can calculate a two-hand synchronization value for the 3D hand keypoints of the user's two hands using a trained two-hand synchronization analyzer. The program 200 may input the generated 3D hand keypoints of the user's uncapturable hand and the 3D hand keypoints of the user's capturable hand into the trained two-hand synchronization analyzer at each diffusion time step. The program 200 can train a two-hand synchronization analyzer by dynamically setting training labels according to the alignment between two time points when the 3D hand keypoints of the two hands, as the input of the analyzer, are respectively captured from within video clips. The video clips can be recorded during the building of the training dataset. If the 3D hand keypoints of a human's two hands, represented as hand joint vectors, are captured at the same time point in the same video clip, the program 200 can set the training label to one. If the 3D hand keypoints of a human's one hand are captured at the time point $t_1$ in a video clip, and the 3D hand keypoints of the same human's other hand are captured at the time point $t_2$ ($t_2 \neq t_1$, both in seconds) in the same video clip, where $t_2$ is in the range of $[t_1-n, t_1)$ or $(t_1, t_1+n]$, and n is a preset duration in seconds, for example, ten seconds, the program 200 can set the training label to the calculated result of the following formula:

$$\text{Training Label} = 1.0 - |t_2 - t_1|/n$$

On the contrary, if the 3D hand keypoints of a human's one hand are captured at the time point $t_1$ in a video clip, and the 3D hand keypoints of the same human's other hand are captured at the time point $t_2$ ($t_2 \neq t_1$, both in seconds) in the same video clip, where $t_2$ is NOT in the range of $[t_1-n, t_1+n]$, the program 200 can set the training label to zero. Additionally, if the 3D keypoints of left and right hands are respectively captured from two different video clips, the program 200 can set the training label to zero. Moreover, if the captured 3D keypoints of left and right hands belong to two different humans respectively, then the program 200 can set the training label to zero.

The trained two-hand synchronization analyzer can analyze the 3D hand keypoints to calculate a two-hand synchronization value. The two-hand synchronization analyzer can utilize a Siamese Neural Network. The program 200 can sample the 3D hand keypoints a total of T times in order to obtain high-quality 3D hand keypoints for the uncaptured hand joints of the uncapturable hand. In some embodiments of the invention, the program 200 may leverage a preset threshold, for example, 0.95, as the maximum two-hand synchronization value. The respective twenty-three 3D keypoints of a user's left-hand joints and right-hand joints can be considered as three-dimensional vectors and can be concatenated into a sixty-nine-dimensional hand joint vector. The program 200 can respectively feed the hand joint vectors of the two hands into two MLP (multilayer perceptron) based encoders, whose parameters are shared. The two-hand synchronization analyzer can calculate the cosine similarity between two d-dimensional hand-joint feature vectors from the two encoders, in order to obtain the final two-hand synchronization value. The program 200 may update the encoder's parameters using a mean-squared error loss.

At 312, the program 200 identifies whether the generated 3D hand keypoints of the user's uncapturable hand are synchronized with the 3D hand keypoints of the user's capturable hand. According to one implementation, if the program 200 identifies that the generated 3D hand keypoints of the user's uncapturable hand are synchronized with the 3D hand keypoints of the user's capturable hand (step 312, "YES" branch), the program 200 may continue to step 314 to render the generated 3D hand keypoints for the user's uncapturable hand joints using a 3D virtual hand modeler. The program 200 may identify, for the T−1 and subsequent samples, that the user's hands are synchronized if the calculated two-hand synchronization value, based on the generated 3D hand keypoints of the uncaptured hand joints at a certain diffusion time step, t>1, and the original 3D hand keypoints of the captured hand joints of the capturable hand, exceeds the maximum two-hand synchronization value resulting from the previous samples. If the program 200 identifies that the user's hands are synchronized, the current denoising diffusion process can be stopped early, meaning less than the T diffusion time steps. The first sample T can be excluded from the calculation of the two-hand synchronization value. If the program 200 identifies that the generated 3D hand keypoints of the user's uncapturable hand are not synchronized with the 3D hand keypoints of the user's capturable hand (step 312, "NO" branch), the program 200 may continue to step 308 to continue performing iterative refinement of the uncapturable hand joints from the user's uncapturable hand using the trained 3D hand joint generative model. The program 200 can identify that the generated 3D hand keypoints of the user's uncapturable hand are not synchronized with the 3D hand keypoints of the user's capturable hand if the calculated two-hand synchronization value does not exceed the maximum two-hand synchronization value resulting from the previous samples.

At 314, the program 200 renders the generated 3D hand keypoints for the user's uncapturable hand joints using a 3D virtual hand modeler. The program 200 can render the generated 3D hand keypoints from the trained 3D hand joint generative model that were determined to be synchronized with the respective hand joints of the capturable hand. The program 200 can render the generated 3D hand keypoints together with the original 3D hand keypoints of the captured hand joints to obtain a pair of intact and visible hands for a user's avatar in a mixed reality (MR) simulated environment. The program 200 can render a mixed reality (MR) simulated environment. The MR simulated environment, herein referred to as "the MR environment", may be a hybrid environment comprising both physical and virtual elements. The MR environment may comprise a hybrid physical/ virtual world in which one or more users may enter, see, move around in, interact with, etc. through the medium of a MR device. The users in the MR environment may be able to see and/or interact with the same virtual objects and virtual elements and may interact with virtual representations of each other. The MR environment may comprise MR environments wherein generated images, sounds, haptic feedback, and other sensations are integrated into a real-world environment. The MR environment may comprise virtual reality (VR) environments that fully replace the physical environment with virtual elements, such that a user experiencing a VR environment cannot see any objects or elements of the physical world; however, the VR environments are anchored to real-world locations, such that the movement of the users, virtual objects, virtual environmental effects and elements all occur relative to the corresponding locations in the physical environment.

Figure 4:
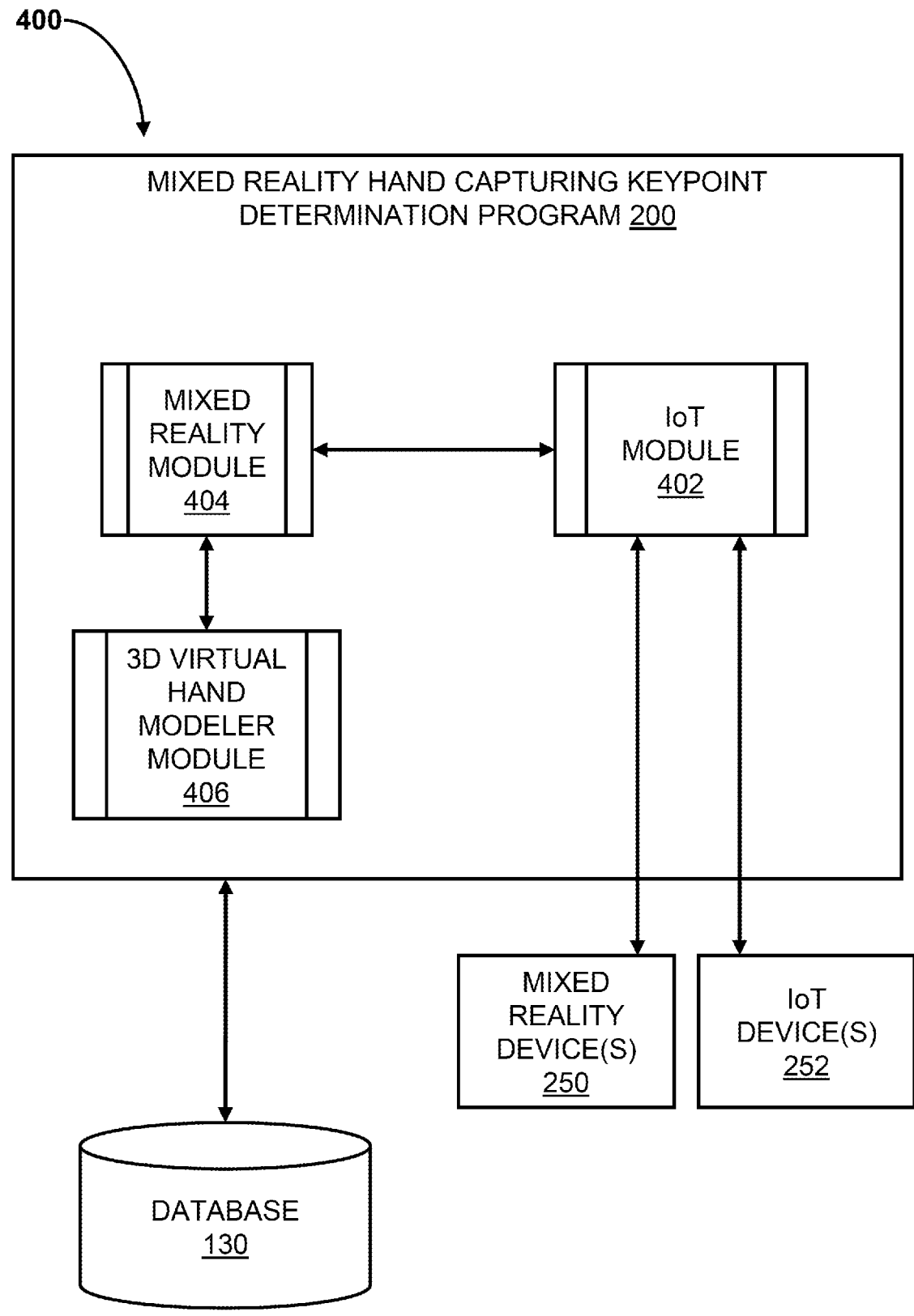
FIG. 4 is a system diagram illustrating an exemplary program environment of an implementation of a mixed reality hand capturing keypoint determination process according to at least one embodiment.

Referring now to FIG. 4, a system diagram illustrating an exemplary program environment 400 of an implementation of a mixed reality hand capturing keypoint determination process 300 is depicted according to at least one embodiment. Here, the program 200 comprises an IoT module 402, a mixed reality module 404, and a 3D virtual hand modeler module 406. The exemplary program environment 400 details the interactions between the IoT module 402 and the mixed reality module 404, and the mixed reality module 404 and the 3D virtual hand modeler module 406. Additionally, the exemplary program environment 400 details the interactions between the mixed reality hand capturing keypoint determination program 200 and the database 130, the IoT module 402 and the mixed reality device(s) 250, and the IoT module 402 and the IoT device(s) 252.

The IoT module 402 may be used to communicate with the mixed reality device(s) 250 and the IoT device(s) 252. The mixed reality module 404 may be used to display the mixed reality environment and the mixed reality objects. The 3D virtual hand modeler module 406 may be used to render the generated 3D hand keypoints of a user's uncapturable hand joints in the mixed reality environment.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for mixed reality, the method comprising:

receiving 3D hand keypoints of a user's visible hand joints from the user's capturable hand and 3D hand keypoints of the user's visible hand joints, if any, from the user's uncapturable hand;

using random noise sampled with a unit normal distribution as initial 3D hand keypoints for one or more uncapturable hand joints from the user's uncapturable hand;

inputting the received 3D hand keypoints and the initial 3D hand keypoints, in a preset order, into a trained 3D hand joint generative model;

performing an iterative refinement of the one or more hand joints from the user's uncapturable hand using the trained 3D hand joint generative model;

identifying whether generated 3D hand keypoints of the user's uncapturable hand are synchronized with the 3D hand keypoints of the user's capturable hand; and rendering the generated 3D hand keypoints for the user's one or more uncapturable hand joints using a 3D virtual hand modeler.

2. The method of claim 1, further comprising:
training the 3D hand joint generative model.

3. The method of claim 1, further comprising:
training a two-hand synchronization analyzer.

4. The method of claim 3, further comprising:
calculating a two-hand synchronization value by using the trained two-hand synchronization analyzer.

5. The method of claim 1, further comprising:
displaying the rendering of the generated 3D hand keypoints for the user's uncapturable hand joints in a mixed reality environment.

6. The method of claim 1, wherein the inputting of the received 3D hand keypoints and the initial 3D hand keypoints, in the preset order, into the trained 3D hand joint generative model, generates 3D hand keypoints for the user's uncapturable hand.

7. The method of claim 1, wherein the performing of the iterative refinement of the one or more hand joints from the user's uncapturable hand using the trained 3D hand joint generative model and the identifying of whether the generated 3D hand keypoints of the user's uncapturable hand are synchronized with the 3D hand keypoints of the user's capturable hand, occur concurrently.

8. A computer system for mixed reality, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving 3D hand keypoints of a user's visible hand joints from the user's capturable hand and 3D hand keypoints of the user's visible hand joints, if any, from the user's uncapturable hand;

using random noise sampled with a unit normal distribution as initial 3D hand keypoints for one or more uncapturable hand joints from the user's uncapturable hand;

inputting the received 3D hand keypoints and the initial 3D hand keypoints, in a preset order, into a trained 3D hand joint generative model;

performing an iterative refinement of the one or more hand joints from the user's uncapturable hand using the trained 3D hand joint generative model;

identifying whether generated 3D hand keypoints of the user's uncapturable hand are synchronized with the 3D hand keypoints of the user's capturable hand; and rendering the generated 3D hand keypoints for the user's one or more uncapturable hand joints using a 3D virtual hand modeler.

9. The computer system of claim 8, further comprising: training the 3D hand joint generative model.

10. The computer system of claim 8, further comprising: training a two-hand synchronization analyzer.

11. The computer system of claim 10, further comprising: calculating a two-hand synchronization value by using the trained two-hand synchronization analyzer.

12. The computer system of claim 8, further comprising: displaying the rendering of the generated 3D hand keypoints for the user's uncapturable hand joints in a mixed reality environment.

13. The computer system of claim 8, wherein the inputting of the received 3D hand keypoints and the initial 3D hand keypoints, in the preset order, into the trained 3D hand joint generative model, generates 3D hand keypoints for the user's uncapturable hand.

14. The computer system of claim 8, wherein the performing of the iterative refinement of the one or more hand joints from the user's uncapturable hand using the trained 3D hand joint generative model and the identifying of whether the generated 3D hand keypoints of the user's uncapturable hand are synchronized with the 3D hand keypoints of the user's capturable hand, occur concurrently.

15. A computer program product for mixed reality, the computer program product comprising:

one or more computer-readable tangible storage medium and program instructions stored on at least one of the one or more tangible storage medium, the program instructions executable by a processor to cause the processor to perform a method comprising:

receiving 3D hand keypoints of a user's visible hand joints from the user's capturable hand and 3D hand keypoints of the user's visible hand joints, if any, from the user's uncapturable hand;

using random noise sampled with a unit normal distribution as initial 3D hand keypoints for one or more uncapturable hand joints from the user's uncapturable hand;

inputting the received 3D hand keypoints and the initial 3D hand keypoints, in a preset order, into a trained 3D hand joint generative model;

performing an iterative refinement of the one or more hand joints from the user's uncapturable hand using the trained 3D hand joint generative model;

identifying whether generated 3D hand keypoints of the user's uncapturable hand are synchronized with the 3D hand keypoints of the user's capturable hand; and rendering the generated 3D hand keypoints for the user's one or more uncapturable hand joints using a 3D virtual hand modeler.

16. The computer program product of claim 15, further comprising:

training the 3D hand joint generative model.

17. The computer program product of claim 15, further comprising:

training a two-hand synchronization analyzer.

18. The computer program product of claim 17, further comprising:

calculating a two-hand synchronization value by using the trained two-hand synchronization analyzer.

19. The computer program product of claim 15, further comprising:

displaying the rendering of the generated 3D hand keypoints for the user's uncapturable hand joints in a mixed reality environment.

20. The computer program product of claim 15, wherein the inputting of the received 3D hand keypoints and the initial 3D hand keypoints, in the preset order, into the trained 3D hand joint generative model, generates 3D hand keypoints for the user's uncapturable hand.

* * * * *